(12) United States Patent
Arlotti et al.

(10) Patent No.: US 8,043,646 B2
(45) Date of Patent: Oct. 25, 2011

(54) SOFT WHEAT FLOUR WITH HIGH BRAN CONTENT, PROCESS FOR ITS PRODUCTION AND BAKERY PRODUCTS CONTAINING IT

(75) Inventors: Guido Arlotti, Parma (IT); Flavio Codovilli, Parma (IT); Michela Petronio, Parma (IT); Roberto Ranieri, Parma (IT)

(73) Assignee: Barilla G. e R. Fratelli S.p.A. (IT)

(*) Notice: Subject to any disclaimer, the term of this patent is extended or adjusted under 35 U.S.C. 154(b) by 1184 days.

(21) Appl. No.: 11/614,280

(22) Filed: Dec. 21, 2006

(65) Prior Publication Data

US 2007/0148319 A1 Jun. 28, 2007

(30) Foreign Application Priority Data

Dec. 23, 2005 (EP) ................................ 05425911

(51) Int. Cl.
*A23L 1/00* (2006.01)
(52) U.S. Cl. ........ 426/518; 426/478; 426/481; 426/549; 426/622
(58) Field of Classification Search ............... 426/72, 426/73, 74, 658, 648, 478, 481, 518, 549, 426/622
See application file for complete search history.

(56) References Cited

U.S. PATENT DOCUMENTS

| 3,995,065 A | 11/1976 | Titcomb et al. |
| 4,896,592 A | 1/1990 | Satake |
| 5,082,680 A | 1/1992 | Tkac |

(Continued)

FOREIGN PATENT DOCUMENTS

DE 36 03 086 C1 5/1993

(Continued)

OTHER PUBLICATIONS

Y. Pomeranz, "Wheat: Chemistry and Technology", American Association of Cereal Chemists, Inc., Third Edition, 1988, vol. 1, pp. 47-95.

(Continued)

*Primary Examiner* — Helen F Heggestad
(74) *Attorney, Agent, or Firm* — Akerman Senterfitt

(57) ABSTRACT

A soft wheat flour containing bran, wherein the bran has a total fiber content comprised between 20 and 30% and a protein content comprised between 12.0 and 18.0% (% in weight of the total weight of the bran); such flour preferably has a bran content comprised between 5 and 30% and is produced by a process which comprises the process phases of a) subjecting soft wheat caryopses (101) to successive process phases involving abrasion in order to substantially remove the bran coating, thereby obtaining various bran fractions, the latter of which (D) originates from the removal of the aleurone, nucellar and testa layers; b) adding the latter bran fraction (D) to a soft wheat flour (F) substantially free of bran in a quantity such as to obtain a flour (C) containing from 5 to 30% of the total mixture weight of bran fraction (D); the invention furthermore refers to a soft wheat flour bakery product containing bran, wherein the bran has a total fiber content comprised between 20 and 30% and a protein content comprised between 12.0 and 18.0% (% in weight of the total weight of the bran), as well as to the use of a soft wheat bran fraction essentially containing the layers of the starting caryopses (101) consisting of the aleurone (105), nucellar (104) and testa (103) layers in the production of whole grain bakery products.

8 Claims, 2 Drawing Sheets

U.S. PATENT DOCUMENTS

2006/0275536 A1* 12/2006 Reid et al. .................... 426/549

FOREIGN PATENT DOCUMENTS

| EP | 0 295 774 A2 | 12/1988 |
| EP | 0 379 144 A1 | 7/1990 |
| GB | 2 005 982 A | 5/1979 |
| WO | WO 2004/028694 A1 | 4/2004 |

OTHER PUBLICATIONS

C. Antoine et al., "Intérêt nutritionnel de la couche à aleurone du grain de blé", Industries des céréales, No. 133, Jun./Jul. 2003, pp. 4-10.

B. Godon, "Bioconversion of Cereal Products", Wiley-Vch, First Edition, Nov. 1993, pp. 1-19.

L. Marquart et al, "Whole Grains and Health—Past, Present and Future", American Institute of Baking Technical Bulletin, vol. XXV, Issue 2, Feb. 2003, pp. 1-14.

Whole Grain Definition, Cereal Foods World, vol. 45, No. 79, 2000.

USDA/USDHHS, "Nutrition and Your Health: Dietary Guidelines for Americans", Fifth Edition, Home and Garden Bulletin No. 232, May 2000.

USDA/USDHHS, "Dietary Guidelines for Americans", Jan. 12, 2005, www.healthierus.gov/dietaryguidelines.

F. Esposito et al, "Antioxidant Activity and Dietary Fibre in Durum Wheat Bran By-Products", Food Research International, vol. 38, 2005, pp. 1167-1173.

E. Decker et al, "Whole Grains as a Source of Antioxidants", Cereal Foods World, vol. 47, No. 8, Oct. 2002, pp. 370-373.

M. Bartnik et al, "Chemical Composition and the Nutritive Value of Wheat Bran", World Rev. Nutr. Diet. Basel, Karger, 1998, vol. 60, pp. 92-131.

C. Stauffer, "Promise of Whole Grains", Bakers Production Manual, May 2003, pp. 12-24.

E.B. Rimm et al, "Vegetable, Fruit, and Cereal Fiber Intake and Risk of Coronary Heart Disease Among Men", Journal of the American Medical Association, 1996, vol. 275, No. 6, pp. 447-451.

A. Wolk et al, "Long Term Intake of Dietary Fiber and Decreased Risk of Coronary Heart Disease Among Women", Journal of the American Medical Association, 1999, vol. 281, No. 21.

D.R. Jacobs et al, "Is Whole Grain Intake Associated with Reduced Total and Cause-Specific Death Rates in Older Women? The Iowa Women's Health Study", Am. J. Public Health, Mar. 1999, vol. 89, No. 3 pp. 322-329.

S. Liu et al, "Whole-Grain Consumption and Risk of Coronary Heart Disease: Results from the Nurses' Health Study", Am. J.mClinical Nutrition, 1999, vol. 70, pp. 412-419.

J. Anderson, "Whole-Grains Intake and Risk for Coronary Heart Disease" In: Whole-Grain Foods in Health and Disease, American Association of Cereal Chemists, Inc., 2002, pp. 187-201.

D. Jenkins et al, "Whole Meal versus Whole Grain Breads: Proportion of Whole or Cracked Grain and the Glycaemic Response", BMJ, vol. 297, 1988, pp. 958-960.

D. Ludwig et al, "Dietary Fiber, Weight Gain, and Cardiovascular Disease Risk Factors in Young Adults", JAMA, 1999, vol. 282, No. 16, pp. 1539-1546.

M. Pereira, "Whole Grain Consumption and Body Weight Regulation", American Association of Cereal Chemists, Inc. 2002, pp. 233-242.

K. Meyer et al, "Carbohydrates, Dietary Fiber, and Incident Type 2 Diabetes in Older Women", American Journal of Clinical Nutrition, 2002, vol. 71, pp. 921-930.

T. Fung et al, Whole-Grain Intake and the Risk of Type 2 Diabetes: a Prospective Study in Men, American Journal of Clinical Nutrition, 2002, vol. 76, pp. 535-540.

D. Jacobs et al, "Whole-Grain Intake and Cancer: An Expanded Review and Meta-Analysis", Nutrition and Cancer, 1998, vol. 30, No. 2, pp. 85-89.

D. Jacobs et al, "Fiber from Whole Grains, but not Refined Grains, is Inversely Associated with All-Cause Mortality in Older Women: The Iowa Women's Health Study", JACN, vol. 19, No. 3, pp. 326S-330S.

T. Galliard, "Rancidity in Cereal Products", Elsevier Applied Science, Second Edition, 1994, pp. 141-160.

R. C. Buri et al, "Description and Characterization of Wheat Aleurone", Cereal Foods World, Sep./Oct. 2004, vol. 49, No. 5, pp. 274-282.

* cited by examiner

SOFT WHEAT FLOUR WITH HIGH BRAN CONTENT, PROCESS FOR ITS PRODUCTION AND BAKERY PRODUCTS CONTAINING IT

FIELD OF APPLICATION

The present invention regards the food industry sector and in particular refers to a soft wheat flour (*Triticum aestivum* L.) having a high bran content, a process for the production thereof and bakery products including it.

PRIOR ART

Cereals (mainly wheat, rice, corn, barley, oat and rye) are consumed across the world as staple food, because they are a primary source of carbohydrates thanks to the high starch content of the endosperm, which is situated in the central part of the caryopsis (see FIG. 1) and represents its major constituent.

With reference to FIG. 1, the structure of the soft wheat caryopsis 101 is briefly reviewed. Going from the outside inwards, there are the following layers composing the bran: four cell layers (longitudinal, transverse, crossed and tubular) which together compose the coating of the fruit or pericarp 102 (3-6% in weight of the total weight of the caryopsis), and then testa 103, nucellar layer (or hyaline layer) 104 and aleurone 105, which together form the coat of the seed (1,2,3). The inner part is composed of endosperm 106 and germ 107.

The aleuronic layer, which makes up 5-7% in weight of the total weight of the caryopsis, is composed of a layer of polygonal cells of large size in contact with the endosperm (1, 2).

Flour is the main product of the soft wheat milling process, the primary objective of which is the achievement of a final product with a high degree of purity (sifted). It is composed of the starchy, innermost parts of the caryopsis (endosperm) following separation from the outermost parts (the bran, which composes about 15% of the total content of the caryopsis, and the germ, which composes about 3%), traditionally intended for animal feed.

Based on this view, the modern process of industrial milling of the soft wheat tends to maximise the efficiency of this separation through a series of many operations (milling, sifting) which permits the separation and removal of the bran from the parts of the endosperm which will make up the final flour.

During the last decade, the nutritional value of "whole grain" cereal flours, i.e. those including the greatest possible quantity of the starting components of the caryopsis (4,5), and therefore also the bran, has been progressively recognised (6,7) as a fundamental element of a healthy diet aimed at maintaining a good state of health for the human being.

A complex series of micro-nutrients are located in the bran, such as dietary fibres (insoluble and soluble), minerals, vitamins, lipids and a class of components known as "phytochemicals", having protective activity (anti-oxidant) in cell metabolism and in phenomena linked to ageing (8,9,10,11, 12). To date, there have been numerous studies and demonstrations of the beneficial effect of the daily consumption of whole grain products in relation to different types of pathologies (13-27).

In spite of the better nutritional properties of whole grain flours, their consumption in the form of pasta and bakery products, and their appeal, is currently hampered by the perceived organoleptic difference compared to the corresponding finished products obtained from refined flours.

The available whole grain products are penalised by a number of negative organoleptic elements including appearance (dark colour), texture (rough, heavy), a marked flavour often associated to the development of off-flavours over time (cardboard taste), which strongly limit their use.

Because of this, consumption of whole grain cereals in the form of whole grain pastas or wholegrain bakery products, even though it is recognised as healthier, is associated to a sense of "dissatisfaction or punishment" from the organoleptic standpoint.

Whole grain flours are conventionally produced in the manner described below.

First, there is the breaking (milling) of the whole caryopses, followed by the separation by sifting of the generated fragments, which may be composed of the endosperm only or of parts of the endosperm together with bran and germ, which are sent to subsequent steps of milling and separation in order to free and separate as much as possible the parts of endosperm from the other components of the caryopsis. In the production of whole grain flour, one proceeds with a recovery of the endosperm parts, together with bran and/or actual bran fractions, which are pooled with the main flow of sifted flour.

The whole grain flours thus obtained therefore contain bran which substantially originates from all the layers of the caryopsis external to the endosperm.

Semolina or cereal flour production processes which comprise a preliminary removal step of the outer layers of the caryopsis through process phases involving friction and abrasion, prior to the milling of the caryopses have been known for many years. As examples, reference is made to patent applications EP 0 295 774, EP 0 373 274 and WO 2004/028694. Accordingly, about 75% of the bran is removed, and the subsequent steps of milling and separation from the residual bran are simplified and generally lead to improved flour yields compared to those obtained with the conventional processes.

With the aforementioned more recent processes, two or more bran fractions are collected, corresponding to as many steps of friction or abrasion carried out on the caryopses. Of these parts, the first is the richest in cellulosic fibres, since it corresponds to the outermost layers of the caryopsis whereas the latter is the richest in protein, since it contains the innermost bran layers, including part of the aleuronic layer.

The whole grain flours available on the market, even when they are obtained by means of one of the aforementioned processes, contain nearly all of the bran present in the caryopses, possibly previously subjected to further milling treatments in order to reduce the size of the particles, and heat stabilisation treatments in order to forestall oxidative phenomena caused by enzymatic degradations.

Also such whole grain flours, and above all the products derived from these (pasta shapes, bakery products), suffer from the same drawbacks from the organoleptic standpoint highlighted above with reference to those obtained by conventional milling processes.

SUMMARY OF THE INVENTION

The problem underlying the present invention was that of providing a soft wheat flour with a high content of dietary bran and preferably such as to be defined whole grain (on the basis of the Italian law, a flour is defined as whole grain when it has an ash content comprised between 1.30 and 1.70% in weight of the dry weight and a minimum protein content of 12.0% in weight of the dry weight) but with organoleptic characteristics such that it results substantially comparable to those of a refined flour.

A similar problem has been solved by a soft wheat flour containing bran having a total fibre content comprised between 20 and 30% in weight of the total weight of the bran and a protein content comprised between 12.0 and 18.0% in weight of the total weight of the bran.

Preferably, the flour according to the invention has a bran content comprised between 5 and 30%, advantageously between 10 and 20%, in weight of its total weight (considering an average humidity content of 10%).

The aforementioned bran mainly contains the aleuronic, nucellar and testa layers of the starting caryopses.

The flour according to the present invention is produced by means of a process which comprises the steps of:

subjecting soft wheat caryopses, having an endosperm and a germ enclosed within a multilayer bran coating, the innermost layers of which correspond to the aleurone, nucellar and testa, to subsequent process phases involving abrasion in order to substantially remove the outer bran coating, thereby obtaining various bran fractions, the latter of which originates from the removal of the aforementioned aleurone, nucellar and testa layers;

adding said latter bran fraction to a soft wheat flour substantially free of bran, in such quantities as to obtain a mixture containing from 5 to 30% of the total mixture weight of said bran fraction;

Preferably, the aforementioned soft wheat flour is obtained by the milling of the caryopses from which the outermost bran coating has been substantially removed, and conveniently such milling step is carried out in the same facility in which the aforementioned process phases involving abrasion take place, continuously pooling the flows of soft wheat flour and the aforementioned latter bran fraction.

The aforementioned process phases involving abrasion are preferably carried out on caryopses which have been previously wetted with a quantity of water such as to bring their humidity content to at least 15% and then subjected to conditioning.

The aforementioned wetting step of the caryopses is preferably carried out by subjecting the caryopses to intense vibrations of a frequency comprised between 50 and 300 Hz.

In one of its further aspects, the invention relates to bakery products containing a bran with a total fibre content comprised between 20 and 30% in weight of the total weight of the bran and a protein content comprised between 12.0 and 18.0% in weight of the total weight of the bran.

Such bakery products generally have a bran content comprised between 2 and 24%, preferably 4-16%, in weight of their total weight.

Finally, the present invention also refers to the use of a fraction of soft wheat bran containing essentially the layers of the starting caryopses, consisting of the aleurone, nucellar and testa layers, in the production of whole grain bakery products.

Such fraction of soft wheat bran may be utilised as obtained from the abrasion step of the process according to the invention, and could be utilized without additional heat stabilization or other treatments and the final products therefrom obtained (pasta shapes, bakery products) exhibit optimal organoleptic properties, which they maintain substantially unaltered throughout their shelf-life.

DETAILED DESCRIPTION OF THE INVENTION

Figure 1:
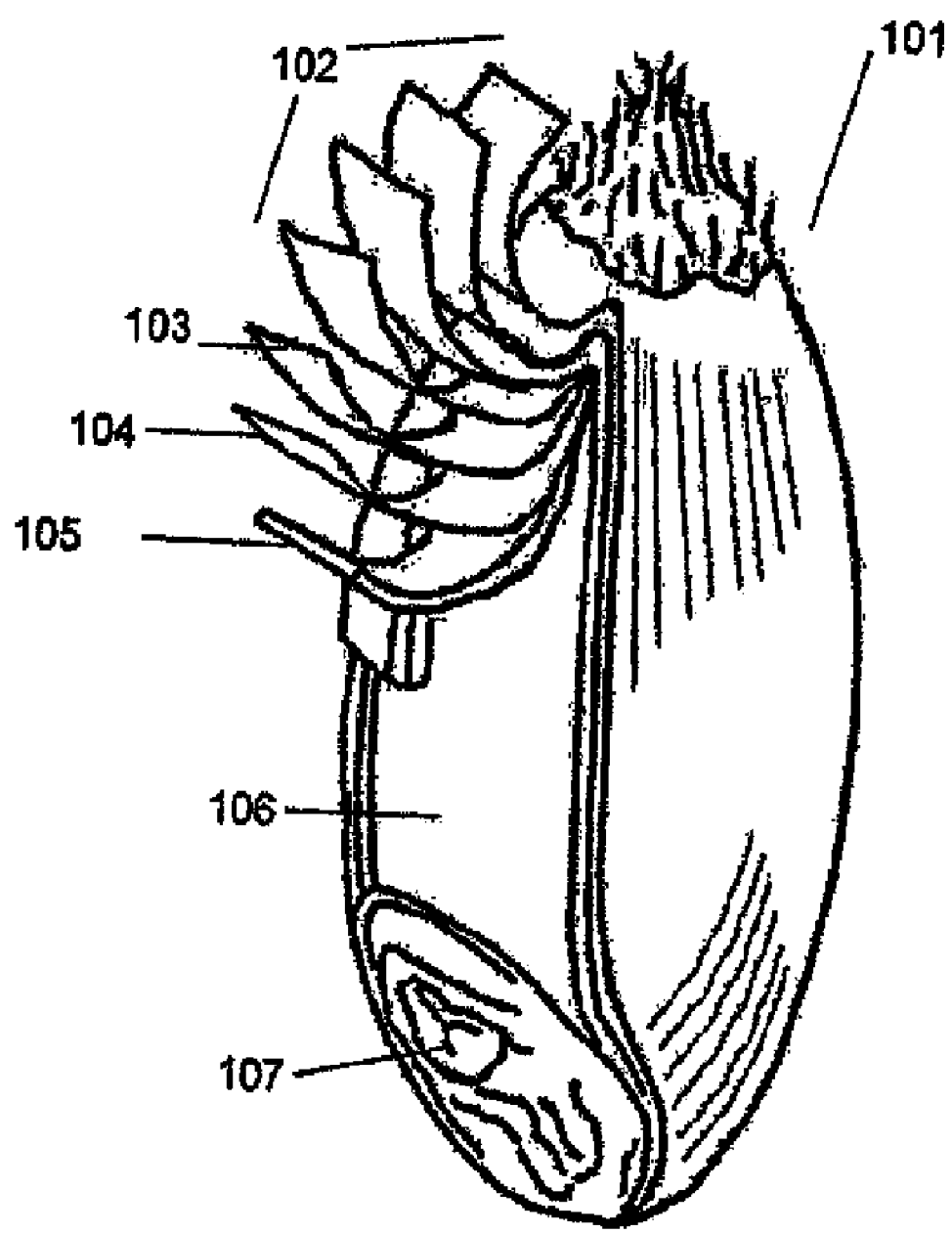
In FIG. 1 a soft wheat caryopsis is schematically illustrated.
Figure 2:
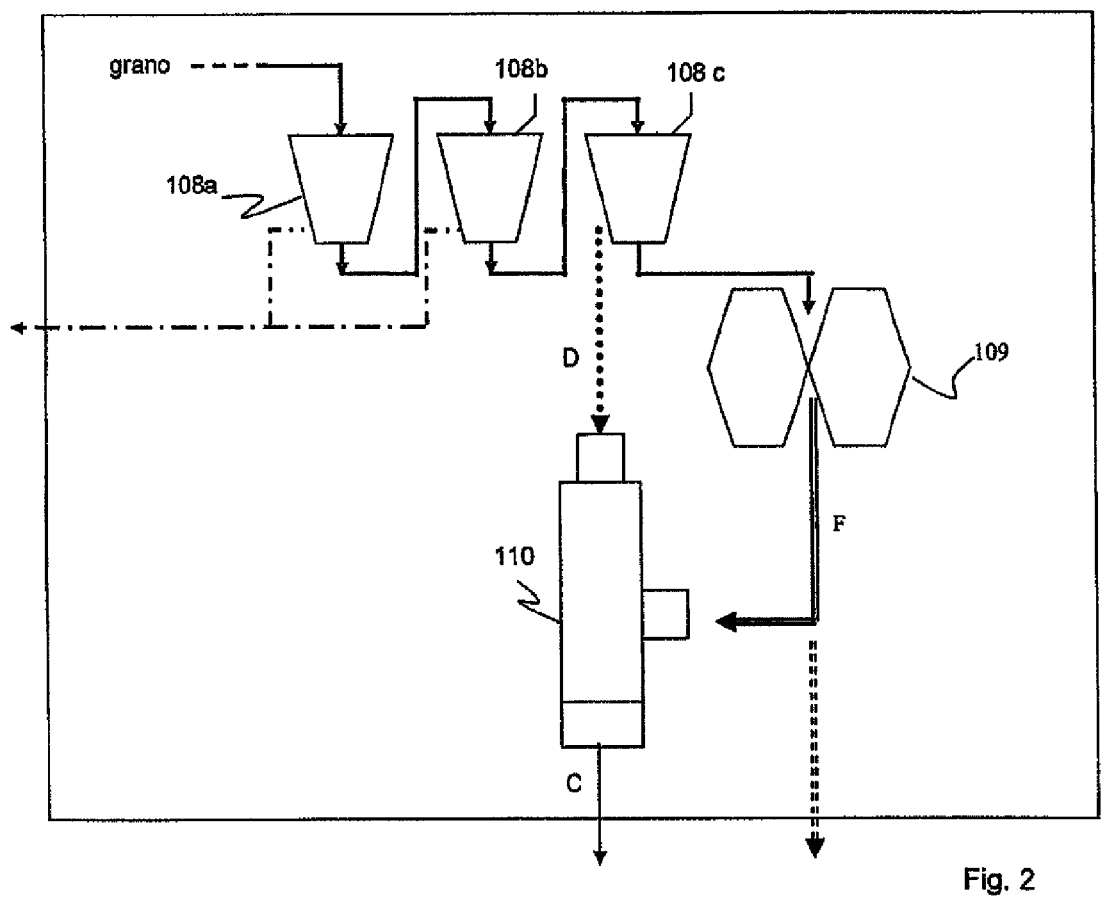
FIG. 2 is a diagram of a facility for the production of a flour according to the present invention.

In accordance with an embodiment of the present invention, the process for the production of a soft wheat flour according to the invention involves the wheat caryopses 101 undergoing, prior to their rupture (milling), progressive removal of the bran layers, by subjecting the outer surface of the caryopsis to the abrasive action of a plurality of decortication or abrasion machines 108a, 108b, 108c (for example 2 or 3), which a flow of wheat passes in series, one after the other.

The decortication or abrasion machines 108a, 108b, 108c consist of a vertical axis rotating shaft, on which the abrasive Carborundum grindstones are mounted. Examples of decortication machines apt for use in the present process are provided in the applications EP 0 373 274 and EP 0 335 174. One machine which is commercially available and useful in the present process is the machine model DECO 420R from T.A.E. The wheat, upon entering the upper part of the machine, is pushed toward the outlet situated in the lower part. In this way, the wheat is forced to spread itself out in the restricted space between the rotating grindstones and a metallic containment baffle, thus undergoing an abrasive action which causes the removal of the outermost bran layers, which are recovered in the form of powder by suction.

This operation is repeated, for example, three consecutive times, thus permitting the progressive separation of increasingly internal bran layers.

With the first passing, the most superficial bran layers are removed, with the second the intermediate layers and finally with the third passing the innermost layers, those nearest to the endosperm and essentially originating from aleurone 105, nucellar 104 and testa 103 layers, are removed.

Finally, the caryopses (101) exiting from the third abrasion machine 108c are fed into a conventional mill 109, in which they are ground, producing a flour F consisting essentially of endosperm.

For its composition characteristics (high protein level, satisfactory content of fibre, minerals and phytochemicals), it is particularly desirable that the third bran fraction D be pooled, during the milling process, with the aforementioned flour F essentially consisting of endosperm.

A typical composition of the third bran fraction D obtained by means of the process according to the present invention is shown in table 1 below. The data represent the average values obtained by the processing of both "soft" soft wheats (category of soft wheats having caryopsis texture which may be easily made into flour by milling) and the "hard" type (category of soft wheat the milled caryopsis of which generates sharp-edged flours).

TABLE 1

| Component | Unit | Value | Tolerance |
|---|---|---|---|
| Humidity | % | 10.0 | ±1.0 |
| Proteins (N × 5.70) | % w/w | 15.0 | ±3.0 |
| Lipids | % w/w | 4.0 | ±2.0 |
| Ash | % w/w | 3.5 | ±1.0 |
| Phosphorus | mg/100 g | 800 | ±200 |
| Magnesium | mg/100 g | 400 | ±100 |
| Total Dietary Fibre | % w/w | 25.0 | ±5.0 |
| Insoluble Dietary Fibre | % w/w | 22.0 | ±5.0 |
| Cellulose | % w/w | 5.0 | ±2.0 |
| Souble Dietary Fibre | % w/w | 3.0 | ±2.0 |

TABLE 1-continued

| Component | Unit | Value | Tolerance |
|---|---|---|---|
| B-glucans | % w/w | 3.0 | ±1.0 |
| Vitamin E (tocopherol) | mg/100 g | 2.0 | ±0.5 |
| Vitamin B1 (thiamine) | mg/100 g | 1.0 | ±0.5 |
| Vitamin B2 (riboflavin) | mg/100 g | 0.4 | ±0.1 |
| Folic acid | μg/100 g | 40 | ±20 |
| Niacin | mg/100 g | 15 | ±10 |

The third decortication fraction D is transported to a doser (for example screw-type), and the same is done for the flow of the product F obtained by the milling of the caryopses from which the bran coating has been removed by the above described abrasion steps. The two dosers converge in a mixer 110, which gives an effective mixing in order to provide a flour C having a good content of dietary bran according to the invention.

Through the mixing screw and immediately before final storage, the flour according to the invention is conveyed towards a storage system.

The soft wheat flour thus obtained proves to be particularly suitable for the production of bakery products, in which the maintenance of the nutritional benefits deriving from the presence of the bran components (fibre, minerals, phytochemicals, vitamins) is associated with organoleptic characteristics (colour, flavour, texture) similar to those of corresponding products obtained from sifted flours, that is, completely free of bran. Moreover, such organoleptic characteristics are maintained substantially unaltered for the entire shelf-life of the finished product.

This is particularly surprising, especially considering the fact that the bran fraction of the food composition according to the invention, contrary to the consistent teachings of the prior art, does not undergo any heat stabilisation treatment.

The bran obtained by the conventional milling processes is indeed subject to deterioration even after a short period of time, due to the triggering of oxidation reactions (rancidity) of the lipid components present in the bran, in which there may also be present parts of the germ, which is very rich in lipids (1,3,28). From the organoleptic standpoint, rancidity leads to the formation, as oxidation products, of volatile and non-volatile chemical products imparting off-odours and off-flavours (peroxides and secondary oxidation products such as aldehydes, alcohols and ketones) (28).

A part of the overall rancidity (enzymatic oxidation) can be caused by the activation of enzymes (lipases and lipoxygenases) found in the bran, which attack the lipid portion present (28).

Normally, in the bran obtained in the conventional way, one tries to contain and prevent this phenomenon by destroying (inactivating) such enzymes by heat (heat treatment), in order to avoid the bran fractions triggering oxidation reactions over time in the finished products in which they are utilised.

The heat treatment of the bran, in addition to representing an additional cost, if done at excessively high temperatures may lead to a further darkening of the bran, the development of odd flavours (toasted, burnt and bitter) and the triggering of a chemical degradation (by heat) of the lipid part (28). On the other hand, by the use of excessively low temperatures, the treatment does not permit the blocking of the lipolytic enzymes.

Without wishing to be bound by theory, the particular stability to oxidation of the bran fraction of the food composition according to the present invention compared to the traditional bran may be due to the fact that it is obtained with a process which involves lower mechanical and thermal stress compared to those involved in conventional processes. The bran obtained with the conventional processes in fact undergo a greater number of milling steps (grindings, separations) through which they are separated from the endosperm and separated. The greater processing to which the bran is subjected in the conventional milling process may favour the creation of a number of conditions (28) (increased exposure to oxygen, increased damage to the cell structures containing the lipid deposits, freeing of or contamination with metal ions acting as catalysts of the oxidation reactions, damage to components protecting from oxidation reactions) which render such bran more susceptible to oxidation.

In addition to having the above mentioned advantages, the bran fraction of the flour according to the present invention has the additional advantage, compared to traditional bran, of supplying a greater quantity of the important nutrients contained in the aleuronic layer (1,2,11,29) and a smaller quantity of the pigmented components, which are present especially in the outermost layers of the bran coating and which are capable of causing a darkening of the products obtained with the conventional whole grain flours.

Finally, the progressive application of the abrasive action, ensured by the described decortication or abrasion machines, permits the isolation and the use of a more internal bran fraction and therefore, from a hygienic-sanitary standpoint, the first two decortication passings may be considered as an additional and significant extension of the selection and cleaning steps which constitute the initial part, upstream of any milling process.

The present invention will be further described by reference to an example, provided here below for illustrative and non-limiting purposes.

EXAMPLE 1

115 kg of soft wheat previously subjected to conventional cleaning steps were wetted with a quantity of water such as to bring the humidity content of the caryopses to 16.5% and simultaneously subjected to the vibrational stresses imparted by a Vibronete machine, produced by Gräf GmbH & Co. KG, Lahnau, Germany (vibrational impulses of the duration of about 10 seconds and at a frequency of 75 Hz). After a single conditioning of 5 hours, the caryopses were fed to a first decortication or abrasion machine 108a, comprising a vertical axis rotating shaft on which abrasive Carborundum grindstones were mounted, thus obtaining the removal of the outermost bran layers, in the form of powder recovered by suction. Two subsequent passings of the caryopses exiting from the first decorticator 108a into two other respective decortication machines 108b and 108c caused the removal of the intermediate and inner bran layers, again in the powder form.

The caryopses exiting from the third decorticator machine 108c were subjected to a dynamic air current cooling, prior to being fed to a conventional mill 109 for milling. Here the decorticated caryopses were milled according to the standard working modes used for the milling of whole caryopses, finally obtaining 89 kg of a flour consisting essentially of endosperm with an ash content of 0.58% in weight of the total weight and a protein content of 11.50% in weight of the total weight.

The third powder exiting from the last decorticator 108c was a bran fraction characterised by the composition shown in the following table 2.

TABLE 2

| Component | Unit | Value |
|---|---|---|
| Humidity | % | 9.8 |
| Proteins (N × 5.70) | % w/w | 16.5 |
| Lipids | % w/w | 3.8 |
| Ash | % w/w | 4.2 |
| Phosphorus | mg/100 g | 880 |
| Magnesium | mg/100 g | 310 |
| Total Dietary Fibre | % w/w | 27.0 |
| Insoluble Dietary Fibre | % w/w | 23.5 |
| Cellulose | % w/w | 4.8 |
| Soluble Dietary Fibre | % w/w | 2.1 |
| B-glucans | % w/w | 2.8 |
| Vitamin E (tocopherol) | mg/100 g | 1.7 |
| Vitamin B1 (thiamine) | mg/100 g | 0.9 |
| Vitamin B2 (riboflavin) | mg/100 g | 0.5 |
| Folic acid | pg/100 g | 35 |
| Niacin | mg/100 g | 17 |

From the pooling of the aforementioned third bran fraction with the flour in a 1:3 weight ratio, a soft whole grain flour was obtained having an ash content of 1.48% and a protein content of 12.75%.

Bread loaves were prepared using the soft whole grain flour thus produced, which were then sliced and packaged in sealed polypropylene food packaging. The bread was then stored for 45 days at room temperature. Bread samples thus stored were periodically assessed by a trained panel of tasters, throughout its entire shelf-life. During such assessments, neither significant variations in the organoleptic properties nor development of off-flavours were detected.

The mentioned bread loaf (AB) was moreover compared with another bread (STD) obtained by an analogous recipe but by using conventional whole grain flour, utilised in a percentage such that it had a fibre content (about 8%) comparable to the former.

A hardness and elasticity detection test was carried out on samples of the two breads by the SMS (Stable Micro System) compression system, in order to assess the variation in softness of the texture throughout a defined time period (20 days). Table 3 shows the data obtained.

TABLE 3

| Sample | Time (days) | RH % | SMS Hardness | SMS Elasticity | Organoleptic Comparison |
|---|---|---|---|---|---|
| AB | 0 | 37.68 | 4.35 | 0.33 | ** |
| STD | 0 | 36,57 | 4.92 | 0.28 | * |
| AB | 10 | 38.08 | 5.62 | 0.30 | ** |
| STD | 10 | 36.77 | 7.18 | 0.25 | * |
| AB | 20 | 35.74 | 6.35 | 0.28 | ** |
| STD | 20 | 34.25 | 8.23 | 0.22 | * |

Organoleptic comparison: the panel expressed the taste preference for both the reference bread and the test bread
(**) = better in taste compared to (*)
The bread obtained according to the present claim (AB) was significantly softer and more elastic compared to that produced using conventional whole grain flour (STD).

BIBLIOGRAPHICAL REFERENCES

1) Y. Pomeranz, Wheat chemistry and Technology, Volume 1, 47-95, Ed. AACC, Third edition, 1988
2) Antoine C., Lullien-Pellerin V., Abecassis J., Rouau X., Intêret nutritionnel de la couche â aleurone du grain de blê, Industries des cêrêales, no 133, Juin/Juillet, 4-10, 2003
3) B. Godon, Bioconversion of Cereal Products, 1$^{st}$ Ed., November 1993 Wiley-Vch, pp 18-19
4) Marquart L., Fulcher G., Slavin J., Whole grain and Health Past, Present and Future. American Inst. of Baking Technical Bulletin, Volume XXV, Issue 2, February 2003
5) CFW. Whole Grain Definition. Cereal Food World, 45: 79, 2000
6) USDA/USDHHS. Nutrition and Your Health: Dietary Guidelines for Americans, 5$^{th}$ ed. U.S. Department of Agriculture/U.S. Department of health and Human Service. U.S. Government Printing Office, Home and Garden Bulletin No. 232, Washington, D.C., May 2000
7) USDA/USDHHS. Dietary Guidelines for Americans 2005, Jan. 12, 2005, www.healthierus.gov/dietaryguidelines
8) F. Esposito, G. Arlotti, A. M. Bonifati, A. Napolitano, D, Vitale, V. Fogliano, Antioxidant activity and dietary fibre in durum wheat bran by-products, Food Research International 38, 1167-1173, 2005
9) L. Marquart, G. Fulcher, J. Slavin, Whole Grain and Health; Past, Present and Future, AIB Tech Bul., 1-14, Vol XXV, Issue 2, February 2003
10) E. Decker, G. Beecher, J. Slavin, H. E. Miller, L. Marquart, Whole Grain as a Source of Antioxidant, Cereal Foods World, 370-373, Vol. 47, NO 8, September-October, 2002
11) M. Bartinik, T. Jakubczyk, Chemical Composition and the Nutritive Value of Wheat Bran. World Rev. Nutr. Diet. Basel, Karger, 1998, vol 60, pp 92-131
12) C. E. Stauffer, Promise of Whole Grains, Bakers Production Manual, 12-24, May 2003
13) Rimm E. B., Ascerio A., Giovannucci E., Spiegelman D., Stampfer M. J., Willett W. C. Vegetable, fruit and cereal fiber intake and risk of coronary heart disease among men. Journal of the American Medical Association 275: 447-451; 1996
14) Wolk A., Manson J. E., Stampfer M. J., Colditz G. A., Hu F. B., Speizer F. E., Hennerkens C. H., Willett W. C. Long-term intake of dietary fibre and decrease risk of coronary heart disease among women, JAMA 1998-2004, 1999
15) Jacobs D. J, Meyer K. A., Kushi L. H., Folsom A. R. Is whole grain intake associated with reduced total and cause specific death rates in older women? The Iowa Women's Health Study Am. J. Public Health, 89(3), 1-8, 1999
16) Liu S. M., Stampfer M. J., Hu F. B., Giovannucci E., Rimm E., Manson J. E., Hennekens C. H. and Willett W. C., Whole-grain consuption and risk of coronary disease: results from the Nurses' Health Study. American Journal of Clinical Nutrition, 70, 412-419, 1999
17) Anderson J. W., Whole-grain intake and risk for coronary heart disease. In: Whole-Grain Foods in Heart and Disease (Marquat, Slavin and Fulcher, eds.) American Association of Cereal Chemists, Inc, St. Paul, Minn., 2002
18) Johnston L., Reynolds H. R., Patz M., Hunninnghake D. B., Schulz K., Westereng B. Cholesterol-lowering benefits of a whole grain oat ready-to-eat cereal. Nutrition in Clinical Care 1 (1), 6-12, 1998
19) Jenkins U, Wesson V, Wolever T. M., Jenkins A. L., Kalmusky J., Gidici S., Csima A., Josse R. G., Wong G. S. Whole meal versus whole grain breads: proportion of whole or cracked grain and the glycemic response. Br. Med. J 297, 958-960, 1988
20) Pereira M. A., Jacobs D. R. Jr, Slattery M. L., Ruth K, Van Horn L., Hilner J., Kushi L. H., The association of whole grain intake and fasting insulin in a biracial cohort of young adults: The CARDIA Study. CVD Prevention, 1, 231-242, 1998
21) Ludwing D. S., Pereira M. A., Kroenke C. H., Hilner J. E., Van Horn L., Slattery M. L., Jacobs D. R., Jr. Dietary fibre, weight gain and cardiovascular disease risk factors in young adults. JAMA 1539-1546, 1999
22) Pereira M. A., Whole grain consumption and body weight regulation. In Whole-Grain Foods in Heart and Disease (Marquat, Slavin and Fulcher, eds.) American Association of Cereal Chemists, Inc., St. Paul, Minn., 2002

23) Meyer K. A., Kushi L. H., Jacobs Jr. D. R., Slavin J., Sellers T. A., and Folsom A. R. Carbohydrates, dietary fiber, and incident type 2 diabetes in older women. American Journal of Clinical Nutrition, 71, 921-930, 2000

24) Fung T. T., Hu F. B., Pereira M. A., Liu S., Stampfer M. J., Colditz G. A., Hennekens C. H. and Willett W. C. Wholegrain intake and the risk of type 2 diabetes: a prospective study in men. American Journal of Clinical Nutrition, 76, 535-540, 2002

25) Jacobs D. R, Marquat L., Slavin J and Kushi L. H. Whole grain intake and cancer: an expanded review and meta-analysis. Nutrition and Cancer, 30, 85-89, 1998

26) Jacobs D. J, Meyer K. A., Kushi L. H. Folsom A. R. Is whole grain intake associated with reduced total and cause specific death rates in older women? The Iowa Women's Health Study Am. J. Public Health, 89(3), 322-329, 1999

27) Jacobs D. J, Pereira M. A. Meyer K. A. and Kushi L. H. Fiber from whole grains, but not refined grains, is inversely associated with all cause mortality in older women: The Iowa Women's Health Study Journal of the American College of Nutrition, 19, 326S-330S, 2000

28) T. Galliard, "Rancidity in Cereal Product", 141-160. in J. C. Allen and R. J. Hamilton "Rancidy of Food", Elsevier Applied Science, 2nd Ed., 1994

29) Buri R. C., von Reading W., Gavin M. H., Description and Characterization of Wheat Aleurone, Cereal Foods World, Vol. 49, 5 September-October, 274-282, 2004

The invention claimed is:

1. A soft wheat flour containing bran, wherein said bran has:
    a total fiber content comprised between 20% and 30% in weight of the total weight of the bran; and
    a protein content comprised between 12% and 18% in weight of the total weight of the bran,
    wherein said bran consists essentially of the following layers of the starting caryopses: aleurone, nucellar and testa layers.

2. A process for the production of a flour according to claim 1, comprising the steps of:
    subjecting soft wheat caryopses, having an endosperm and a germ enclosed in a multilayer bran coating the innermost layers of which correspond to the aleurone, nucellar and testa layers, to subsequent process phases involving abrasion in order to substantially remove said bran coating, thereby obtaining various bran fractions, the latter (D) of which originates from the removal of the aforementioned aleurone, nucellar and testa layers only;
    adding said latter bran fraction to a soft wheat flour substantially free of bran, in a quantity such as to obtain a flour containing between 5 and 30% of the total weight of said flour of said bran fraction (D).

3. The process according to claim 2, wherein said soft wheat flour is obtained by the milling of said caryopses from which said bran coating has been substantially removed.

4. The process according to claim 3, wherein the milling of said caryopses is carried out in the same facility in which said process phases involving abrasion are carried out and wherein the flows of soft wheat flour obtained by the milling and of said latter bran portion (D) are continuously pooled.

5. The process according to claim 2, wherein said process phases involving abrasion are carried out on caryopses which have been previously wetted with a quantity of water such as to bring the humidity content thereof to at least 15% and then subjected to conditioning.

6. A soft wheat flour containing bran, wherein said bran has:
    a total fiber content comprised between 20% and 30% in weight of the total weight of the bran;
    a protein content comprised between 12% and 18% in weight of the total weight of the bran; and
    a bran content comprised between 10% and 20% in weight of the total weight of the flour,
    wherein said bran consists essentially of the following layers of the starting caryopses: aleurone, nucellar and testa layers.

7. A soft wheat flour-based bakery product containing bran, wherein said bran has:
    a total fiber content comprised between 20% and 30% in weight of the total weight of the bran; and
    a protein content comprised between 12% and 18% in weight of the total weight of the bran,
    wherein said bran consists essentially of the following layers of the starting caryopses: aleurone, nucellar and testa layers.

8. A soft wheat flour-based bakery product containing bran, wherein said bran has:
    a total fiber content comprised between 20% and 30% in weight of the total weight of the bran;
    a protein content comprised between 12% and 18% in weight of the total weight of the bran; and
    a bran content comprised between 4% and 16% in weight of the total weight thereof,
    wherein said bran consists essentially of the following layers of the starting caryopses: aleurone, nucellar and testa layers.

* * * * *